United States Patent [19]

Gleen

[11] Patent Number: 5,783,090
[45] Date of Patent: Jul. 21, 1998

[54] IONIC WATER TREATMENT SYSTEM

[76] Inventor: George S. Gleen, 1785 Johnson Ferry Rd., Atlanta, Ga. 30319

[21] Appl. No.: 683,709

[22] Filed: Jul. 18, 1996

Related U.S. Application Data

[63] Continuation-in-part of Ser. No. 453,636, May 26, 1995, abandoned.

[51] Int. Cl.$^6$ .................. C02F 1/46; C02F 1/461; C02F 1/467
[52] U.S. Cl. ............. 210/748; 210/764; 204/555; 204/556; 204/660; 204/661; 204/666; 204/672; 204/673
[58] Field of Search .................. 210/764, 748; 204/660, 661, 666, 672, 673, 555, 556

[56] References Cited

U.S. PATENT DOCUMENTS

3,092,566  6/1963  Negus .................. 204/240
4,492,618  1/1985  Eder .................... 204/152

*Primary Examiner*—Neil McCarthy
*Attorney, Agent, or Firm*—Needle & Rosenberg, P.C.

[57] ABSTRACT

An apparatus for reducing micro-organism concentrations in a liquid having a surface has a portion of a first electrode that is disposed within the liquid. A portion of a second electrode is also disposed within the liquid. The second electrode is spaced apart from the first electrode and, in one embodiment, consists of a copper and silver alloy wherein the ratio of copper to silver is in the range of from 1:1 to 11:3. A direct current power supply, having a positive terminal and a negative terminal, applies an electrical potential between the second electrode and the first electrode, thereby creating an electrical current from the second electrode to the first electrode and thereby liberating copper ions and silver ions from the second electrode into the liquid. In one embodiment, the electrodes are suspended from a floating member. In another embodiment, the electrodes are placed in a porous sheath that is suspended in the liquid.

23 Claims, 3 Drawing Sheets

IONIC WATER TREATMENT SYSTEM

CROSS-REFERENCE TO RELATED APPLICATION

This application is a continuation-in-part of application Ser. No. 08/453,636, filed May 26, 1995, for "Method of Treating Water", now abandoned.

BACKGROUND OF THE INVENTION

1. Field Of The Invention

The present invention relates to treatment systems for water and other fluids, and more particularly, to systems for reducing micro-organisms in such fluids.

2. Description Of The Prior Art

All advanced societies require a reliably safe and pure source of water for drinking and other personal uses. It is also important to control the growth of water-borne micro-organisms in water used for industrial and manufacturing purposes. Traditionally, this has been achieved by using strong oxidizing agents such as chlorine, peroxide or ozone. More recently, other, non-oxidizing, biocidal chemicals have been employed in efforts to control algae, bacteria, and fungi, particularly in industrial and manufacturing applications. All such chemical approaches have significant drawbacks. All these agents are quite toxic and pose significant risk to using personnel. In addition, some of the reaction products have environmental risks and can create disposal problems of their own.

Some devices in the prior art treat water by injecting copper and silver ions into the water. It is generally known that many water-born microorganisms cannot survive in contact with such ions. These devices employ two oppositely charged electrodes, wherein one electrode comprises a copper-silver alloy. However, existing devices, such as the one disclosed by Negus (U.S. Pat. No. 3,092,566), divert treated water into casings that would be quickly blocked when treating industrial waste water having high concentrations of tramp oil and floating debris. Furthermore, some existing devices have the copper-silver alloy electrode upstream or parallel to the other electrode. This causes the disadvantage of some of the injected copper and silver ions being drawn out of the treated water by the second electrode, thereby reducing the efficiency of the device.

No device exists in the prior art that allows for treatment of water containing tramp oil and floating debris. Furthermore, no device in the prior art maintains an alloy electrode down stream of other active electrodes, thereby preventing reabsorption of injected ions.

SUMMARY OF THE INVENTION

The disadvantages of the prior art are overcome by the present invention which, in one aspect, is an apparatus for reducing micro-organism concentrations in a liquid having a surface. A portion of a first electrode is disposed within the liquid. A portion of a second electrode is also disposed within the liquid. The second electrode is spaced apart from the first electrode and comprises a copper and silver alloy wherein the ratio of copper to silver is in the range of from 1:1 to 11:3. A direct current power supply, having a positive terminal and a negative terminal, applies an electrical potential between the second electrode and the first electrode, thereby creating an electrical current from the second electrode to the first electrode and thereby liberating copper ions and silver ions from the second electrode into the liquid.

Another aspect of the invention is an apparatus for reducing micro-organism concentrations in a liquid having a surface and having a flow direction so that the liquid flows from upstream to downstream. A portion of a first electrode is disposed within the liquid. The first electrode comprises a first plate having a first top edge opposite first bottom edge and first flat surface, disposed so that the first flat surface is in alignment with the flow direction. A portion of a second electrode is disposed within the liquid so that the second electrode is spaced apart from the first electrode. The second electrode comprises a second plate having a second flat surface and disposed so that the second flat surface is in alignment with the flow direction and so that the second electrode is downstream from the first electrode. The second plate comprises a copper and silver alloy, wherein the ratio of copper to silver is in the range of from 30:30 to 110:30. A portion of a buoyant member, having a top surface and an opposite bottom surface, floats in the liquid with the first electrode and the second electrode being suspended from the buoyant member. A plurality of spacers separate the first electrode and the second electrode from the bottom surface of the buoyant member so that the first electrode and the second electrode extend below any oil or debris that floats on the surface of the liquid. A direct current power supply, having a positive terminal and a negative terminal, applies an electrical potential between the second electrode and the first electrode, thereby creating an electrical current from the second electrode to the first electrode and thereby liberating copper ions and silver ions from the second electrode into the liquid. A circuit controls the electrical current so that the copper ions have a concentration in the liquid of less than 5 parts per million and so that the silver ions have a concentration in the liquid of less than 40 parts per billion.

In yet another aspect of the invention, a portion of a first electrode is disposed within the liquid. A portion of a second electrode is disposed within the liquid so that the second electrode is spaced apart from the first electrode. The second electrode comprises a copper and silver alloy, wherein the ratio of copper to silver is in the range of from 30:30 to 110:30. A direct current power supply applies an electrical potential between the second electrode and the first electrode, creating an electrical current from the second electrode to the first electrode, thereby causing the second electrode to liberate copper ions and silver ions into the liquid. A circuit controls the electrical current so that the copper ions have a concentration in the liquid of less than 5 parts per million and so that the silver ions have a concentration in the liquid of less than 40 parts per billion. A sheath defines a first cavity and a second cavity. The first electrode is disposed within the first cavity and the second electrode disposed within the second cavity. The sheath comprises a material that allows the liquid to flow into and out of the cavity and that allows ions produced by the second electrode to flow out of the cavity.

Yet another aspect of the invention is a method of reducing micro-organism concentrations in a flowing liquid involving placing a portion of a first electrode within the liquid. A portion of a second electrode is placed within the liquid so that it is downstream and spaced apart from the first electrode. The second electrode comprises a copper and silver alloy wherein the ratio of copper to silver is in the range of from 1:1 to 11:3. A direct current electrical potential is applied between the second electrode and the first electrode, thereby creating an electrical current from the second electrode to the first electrode and thereby liberating copper ions and silver ions from the second electrode into the liquid. The electrical current is controlled so that the copper ions have a concentration in the liquid of less than 5 parts per million and so that the silver ions have a concentration in the liquid of less than 40 parts per billion.

These and other aspects of the invention will become apparent from the following description of the preferred embodiment taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: "a," "an," and "the" includes plural reference, "in" includes "in" and "on."

Figure 1:
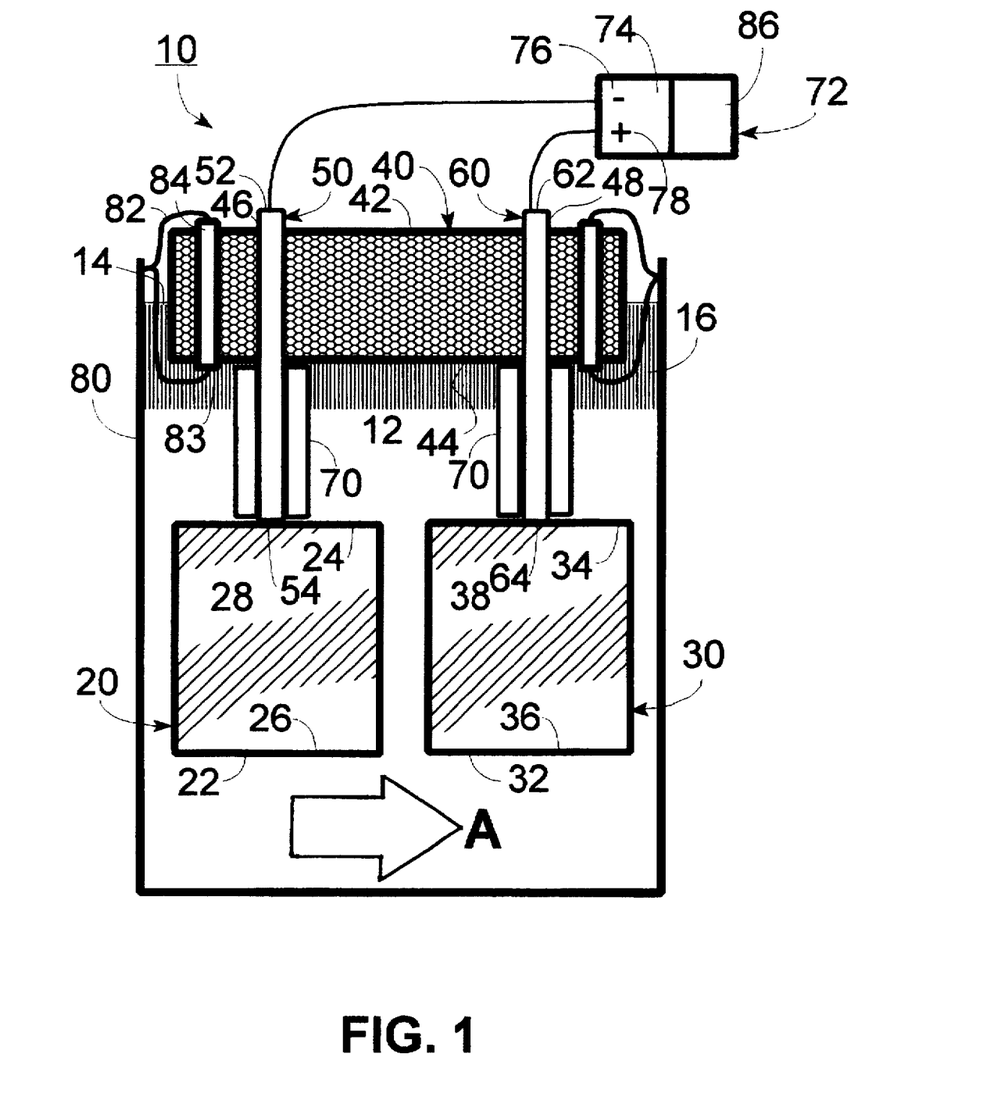
FIG. 1 is a schematic drawing of one embodiment of the present invention.

As shown in FIG. 1, one embodiment of the invention is an apparatus 10 for reducing micro-organism concentrations in a liquid 12, such as water, flowing through a tank 80, such as a coolant sump used in industrial applications, in the direction of arrow A. Disposed within the liquid 12 are a first electrode 20 and a second electrode 30. The second electrode 30 is downstream from the first electrode 20. The first electrode 20 comprises a first plate 22 having a first top edge 24, an opposite first bottom edge 26 and first flat surface 28. The first electrode 20 is disposed so that the first flat surface 28 is in alignment with the flow direction A of the liquid 12. The second electrode 30 is spaced apart from the first electrode 20 and comprises a second plate 32 having a second flat surface 38, a second top edge 34 and an opposite second bottom edge 36. The second electrode 30 is disposed so that the second flat surface 38 is in alignment with the flow direction A and so that the second electrode 30 is downstream from the first electrode 20.

The second plate 32 comprises a copper and silver alloy, wherein the ratio of copper to silver is in the range of from 30:30 to 110:30. Preferably, the ratio of copper to silver in the second electrode 32 is 7:3. In some applications, the second electrode 30 may also comprise zinc. A control unit 72, comprising a direct current power supply 74, having a positive terminal 78 and a negative terminal 76, and a circuit 86 for controlling the power supply 74, applies a current to the electrodes 20, 30, thereby causing the second electrode 30 to liberate copper and silver ions into the liquid 12. The dimensions of the first and second electrodes 20, 30 in one embodiment are 1"×¼"×4" however, these dimensions depend on desired capacity, and may vary depending on the flow rate and the microbial concentration of the liquid 12.

Floating in the liquid 12 is a buoyant member 40 having a top surface 42 and an opposite bottom surface 44. The buoyant member 40 could comprise any non-conducting material having sufficient buoyancy to suspend the electrodes 20, 30 in the liquid 12. One example of a suitable material is styrofoam. The buoyant member 40 defines a first hole 46 and a second hole 48, each passing therethrough from the top surface 42 to the bottom surface 44. The buoyant member 40 may be held in position in the tank 80 by making a hole 84 therethrough, fitting the hole 84 with a piece of plastic tubing 83, passing a wire 82 therethrough and fastening the wire 82 to the tank 80.

Affixed to the first top edge 24 of the first electrode 20 is a first conductive rod 50 having a first top end 52 and a first bottom end 54, with the first bottom end 54 being affixed to the first top edge 24. The first conductive rod 50 projects through the first hole 46 so that the first top end 52 extends above the top surface 42 of the buoyant member 40. Similarly, a second conductive rod 60 having a second top end 62 and a second bottom end 64, with the second bottom end 64 being affixed to the second top edge 34 of the second electrode 30, projects through the second hole 48 so that the second top end 62 extends above the top surface 42 of the buoyant member 40. A plurality of spacers 70 separate the first electrode 20 and the second electrode 30 from the bottom surface 44 of the buoyant member 40 so that the first electrode 20 and the second electrode 30 extend below any oil 16 or debris that floats on the surface 14 of the liquid 12.

The power supply 74 is in electrical communication with the second top end 62 and the first top end 52 so that the power supply 74 applies the electrical potential between the first top end 52 and the second top end 62. Thus, the power supply 74 applies an electrical potential between the second electrode 30 and the first electrode 20, thereby creating an electrical current from the second electrode 30 to the first electrode 20, thus liberating copper ions and silver ions from the second electrode 30 into the liquid 12. The control unit 72 also comprises a circuit 86 for controlling the electrical current so that the copper ions have a concentration in the liquid of less than 5 parts per million and so that the silver ions have a concentration in the liquid of less than 40 parts per billion. The control circuit 86, in simple applications, could comprise a rheostat in series with the power supply 74, or it could comprise a more complex control circuit (the design of which being obvious to those skilled in the art of control circuit design).

In one embodiment, the power supply 74 may also include a circuit (not shown) for periodically switching between a first voltage polarity and a second voltage polarity applied between the first electrode 20 and the second electrode 30. In one commercial embodiment, the polarity is switched roughly every 10 seconds (although other switching periods are contemplated by the invention, the choice of period depending upon the specific application). Switching the polarity between the electrodes 20, 30 prevents fouling of the electrode surfaces. When the polarity-reversal circuit is employed, the first electrode 20 and the second electrode 30 would usually be of the same composition (i.e., a copper-silver alloy). The circuit would be a switching circuit of the type generally known to an artisan skilled in the art of circuit design.

It should also be noted that several embodiments of the invention do no employ a polarity reversing circuit. These embodiments are used with fluids that are less likely to foul the electrodes 20, 30. An advantage of a non-polarity reversing system is that one of the electrodes may be made of an inexpensive conductor, rather than a copper-silver alloy.

The control unit 72 may also comprise a display (not shown) that indicates a power setting, wherein a drop in the power setting indicates that at least one of the first or second electrodes needs cleaning. The control unit 72 may also comprise a test circuit (not shown) that indicates when an electrode is inoperable.

Figure 2:
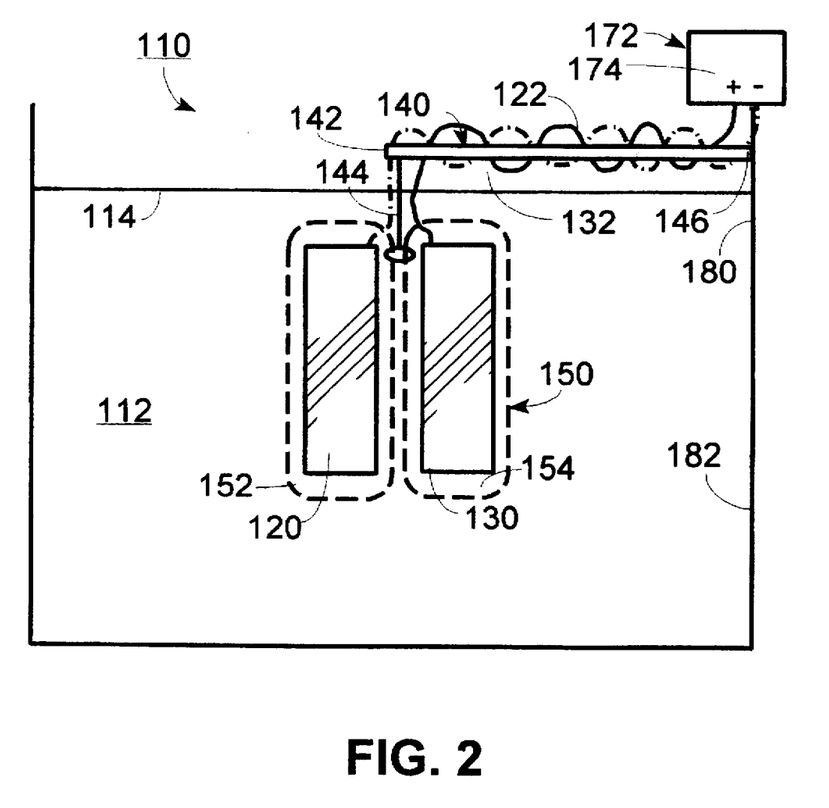
FIG. 2 is a schematic drawing of a second embodiment of the present invention.

As shown in FIG. 2, a second embodiment of the invention is an apparatus 110 comprising a first electrode 120 and a second electrode 130 comprising a copper and silver alloy. A control unit 172 includes a direct current power supply 174 that applies an electrical potential between the second electrode 130 and the first electrode 120, creating an electrical current from the second electrode 130 to the first electrode 120. This causes the second electrode 130 to liberate copper ions and silver ions into the liquid 112. The control unit 172 controls the electrical current so that the copper ions have a concentration in the liquid 112 of less than 5 parts per million and so that the silver ions have a concentration in the liquid 112 of less than 40 parts per billion. A first wire 122 electrically connects the first electrode 120 to the power supply 174 and a second wire 132 electrically connects the second electrode 130 to the power supply 174.

A sheath 150 defines a first cavity 152 and a second cavity 154. The first electrode 120 is disposed within the first cavity 152 and the second electrode 130 is disposed within the second cavity 154. The sheath 150 comprises a material that allows the liquid 112 to flow into and out of the first and second cavities 152, 154 and that allows ions produced by the second electrode 130 to flow out of the second cavity 154. Suitable materials include woven plastic mesh or pierced plastic sheet. The material of the sheath 150 should define openings having an average diameter in the range of between 1/64" and 1/2". Generally, higher capacity units require larger openings.

The liquid 112 flows through a tank 180 having an outer wall 182. The sheath 150 is suspended so that first electrode 120 and the second electrode 130 are disposed below the surface 114 of the liquid 112 spaced away from the outer wall 182 by a rod 140 having a first 25 end 146 in an affixed relation to the wall 182 of the tank 180 and an opposite second end 142 extending away from the wall 182. A suspending wire 144 hangs the sheath 150 from the second end 142.

Figure 3:
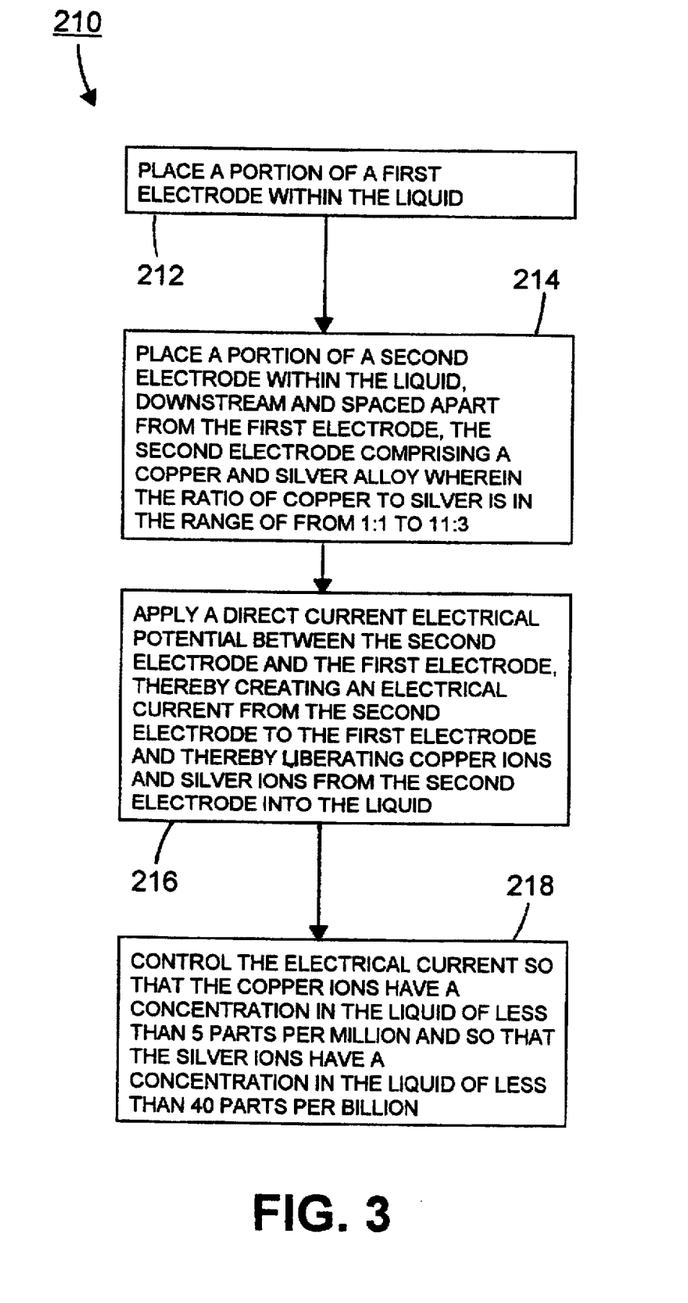
FIG. 3 is a flow chart in accordance with the method of the present invention.

As shown in FIG. 3, the method 210 of the present invention comprises the steps of placing a portion of a first electrode within the liquid 212 and of placing a portion of a second electrode within the liquid, downstream and spaced apart from the first electrode, the second electrode comprising a copper and silver alloy wherein the ratio of copper to silver is in the range of from 1:1 to 11:3 214. Next is the step of applying a direct current electrical potential between the second electrode and the first electrode, thereby creating an electrical current from the second electrode to the first electrode and thereby liberating copper ions and silver ions from the second electrode into the liquid 216 and then the step of controlling the electrical current so that the copper ions have a concentration in the liquid of less than 5 parts per million and so that the silver ions have a concentration in the liquid of less than 40 parts per billion 218.

Generally, the ion population can be controlled by varying the amperage and voltage of the current supplied to the electrodes. The electrodes should be placed in an area of relatively high movement so that the ions are distributed throughout the liquid system. The electrode assembly can be suspended just beneath the surface, mounted in a pipe, or arranged in any other manner which affords good contact with the water and sufficient movement of the water over the electrodes.

The ions are generated by an oxidation step involving the loss of one or more electrons from the zero state, or metallic state, of a given element. For example, in the case of copper, two electrons are given up by each atom of copper to generate a $Cu^{+2}$ ion:

$$Cu^0 \rightarrow Cu^{+2} + 2e^{-1}$$

Similarly, each silver atom gives up one electron at the anode surface to generate a $Ag^{+1}$ ion. Each zinc atom gives up two electrons to generate a $Zn^{+2}$ ion. The ions are generated at the anode surface and then diffuse throughout the water system.

Copper ions are recognized as being effective against both algae and fungi, while silver has been shown to be very effective against bacteria. The length of time required to bring a microbiological population under control varies from system to system. Laboratory and field studies have shown that control is usually achieved in 3–4 days after the ion generating system is installed. The following laboratory study, employing a power unit capable of generating a maximum current of 50 milliamps connected to an electrode composed of a 10:1:1 mixture of copper:silver:zinc respectively, illustrates this point. This configuration gave excellent control of the bacteria as well as fungi, mold, and algae.

The present invention has been found to provide an effective method of killing a wide range of microorganisms in a variety of water systems. In one test, an 8 ounce sample of cooling tower water heavily contaminated with bacteria was added to a stirred five gallon constant temperature water bath maintained at 80° F. Nutrients were added and the system was allowed to equilibrate for 24 hours. A mild steel wire support system was also added to provide attachment surfaces for the bacteria. After 24 hours, a bacteria test indicated a population in excess of $10^7$/cc. Bacteria streamers were attached to much of the steel support by this time.

The ion generating system was turned on at a mid-range power setting and was operated at this setting for five days. A biological test strip was inoculated daily. The results of this testing are shown in table below. The reduction in bacteria levels was slow on days one and two, but picked up significantly thereafter. The biological test done on day 4 shows a level of only $10^2$/cc viable bacteria. The streamers attached to the metal support were visibly breaking up and coverage on the steel support system was diminishing.

| Time in Hours* | Bacterial Populations/cc |
|---|---|
| 0 | $1 \times 10^7$ |
| 24 | $2 \times 10^6$ |
| 28 | $1 \times 10^6$ |
| 72 | $1 \times 10^3$ |
| 96 | $1 \times 10^2$ |

*Number of hours after ion generating system was started.

Bacterial populations of $1 \times 10^3$ or less per cubic centimeter of solution are considered excellent control for industrial systems. Field studies in cooling tower systems and emulsion coolant systems have confirmed these results. Bacterial populations continue to decrease with continued use, often approaching undetectable levels. Similar effects are seen on algae, mold, and fungus populations.

By using the appropriate blend of metals in the electrodes, it is possible to control a wide range of microorganisms with only the ions. The makeup of the electrodes can be easily varied by changing the proportions of each metal in the manufacture of the electrode. The rate at which the ions are generated at the electrode surface can be controlled electronically by the power source. The operator simply adjusts the power output of the power source so that an effective steady-state level of ions is achieved.

While the principal target of this treatment program is industrial water used in such applications as cooling, heat transfer, and coolant emulsions for metalworking, it could also be used in controlling microbiological populations in decorative systems such as fountains, and in human contact systems such as swimming pools, spas, and potable water.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for reducing micro-organism concentrations in a liquid, comprising:
   a. a first electrode, a portion of which is disposed within the liquid;
   b. a second electrode, a portion of which is disposed within the liquid, spaced apart from the first electrode, the second electrode comprising a copper and silver alloy wherein the ratio of copper to silver is in the range of from 1:1 to 11:3; and
   c. a direct current power supply for applying an electrical potential between the second electrode and the first electrode, thereby creating an electrical current from the second electrode to the first electrode and thereby liberating copper ions and silver ions from the second electrode into the liquid.

2. The apparatus of claim 1, wherein the direct current power supply further comprises means for periodically switching between a first voltage polarity, wherein the first electrode is positive and the second electrode is negative, and a second voltage polarity, wherein the first electrode is negative and the second electrode is positive.

3. The apparatus of claim 1, further comprising means for controlling the electrical current so that the copper ions have a concentration in the liquid of less than 5 parts per million and so that the silver ions have a concentration in the liquid of less than 40 parts per billion.

4. The apparatus of claim 3 wherein the controlling means comprises a display that indicates a power setting, wherein a drop in the power setting indicates that at least one of the first or second electrodes needs cleaning.

5. The apparatus of claim 4, further comprising a test circuit that indicates when an electrode is inoperable.

6. The apparatus of claim 1 wherein the ratio of copper to silver in the second electrode is 7:3.

7. The apparatus of claim 1 wherein the second electrode also comprises zinc.

8. The apparatus of claim 1 wherein the liquid has a flow direction so that the liquid flows from upstream to downstream and wherein:
   a. the first electrode comprises a first plate having a first top edge an opposite first bottom edge and first flat surface, disposed so that the first flat surface is in alignment with the flow direction; and
   b. the second electrode comprises a second plate having a second top edge, an opposite second bottom edge and a second flat surface, the second electrode being disposed so that the second flat surface is in alignment with the flow direction and so that the second electrode is downstream from the first electrode.

9. An apparatus for reducing micro-organism concentrations in a liquid, comprising:
   a. a first electrode portion of which is disposed within the liquid;
   b. a second electrode, a portion of which is disposed within the liquid, spaced apart from the first electrode, the second electrode comprising a copper and silver alloy wherein the ratio of copper to silver is in the range of from 1:1 to 11:3;
   c. a direct current power supply for applying an electrical potential between the second electrode and the first electrode, thereby creating an electrical current from the second electrode to the first electrode and thereby liberating copper ions and silver ions from the second electrode into the liquid; and
   d. a buoyant member having a top surface and an opposite bottom surface, a portion of the buoyant member floating in the liquid, the first electrode and the second electrode being suspended from the buoyant member; wherein the liquid has a flow direction so that the liquid flows from upstream to downstream and wherein:
      the first electrode comprises a first plate having a first top edge an opposite first bottom edge and first flat surface, disposed so that the first flat surface is in alignment with the flow direction; and
      the second electrode comprises a second plate having a second top edge, an opposite second bottom edge and a second flat surface, the second electrode being disposed so that the second flat surface is in alignment with the flow direction and so that the second electrode is downstream from the first electrode.

10. The apparatus of claim 9 wherein the buoyant member defines a first hole and a second hole, each passing therethrough from the top surface to the bottom surface, the apparatus further comprising:
    a. a first conductive rod having a first top end and a first bottom end, the first bottom end affixed to the first top edge of the first electrode, the first conductive rod projecting through the first hole so that the first top end extends above the top surface of the buoyant member, the power supply being in electrical communication with the first top end; and
    b. a second conductive rod having a second top end and a second bottom end, the second bottom end affixed to the second top edge of the second electrode, the second conductive rod projecting through the second hole so that the second top end extends above the top surface of the buoyant member, the power supply being in electrical communication with the second top end,
    so that the power supply applies the electrical potential between the first top end and the second top end.

11. The apparatus of claim 10 wherein the first electrode and the second electrode are each separated from the bottom surface of the buoyant member by a spacer so that the first electrode and the second electrode extend below any oil or debris that floats on the surface of the liquid.

12. An apparatus for reducing micro-organism concentrations in a liquid, comprising:
    a. a first electrode, a portion of which is disposed within the liquid;
    b. a second electrode, a portion of which is disposed within the liquid, spaced apart from the first electrode, the second electrode comprising a copper and silver alloy wherein the ratio of copper to silver is in the range of from 11 to 11:3
    c. a direct current power supply for applying an electrical potential between the second electrode and the first electrode, thereby creating an electrical current from the second electrode to the first electrode and thereby liberating copper ions and silver ions from the second electrode into the liquid; and d. a sheath defining a first cavity and a second cavity, the first electrode disposed within the first cavity and the second electrode disposed within the second cavity, the sheath comprising a material that allows the liquid to flow into and out of the cavity and that allows ions produced by the second electrode to flow out of the cavity.

13. The apparatus of claim 12 wherein the sheath comprises a material that defines a plurality of openings passing therethrough, the diameter of the openings being in the range of from 1/64th of an inch to 1/2 of an inch.

14. The apparatus of claim 12 wherein the liquid flows through a tank having an outer wall and further comprising means for suspending the sheath so that first electrode and the second electrode are disposed below the surface of the liquid and spaced apart from the outer wall.

15. The apparatus of claim 14 wherein the suspending means comprises a rod having a first end in an affixed relation to the wall of the tank and an opposite second end extending away from the wall so that the sheath hangs from the second end.

16. An apparatus for reducing micro-organism concentrations in a liquid having a surface and having a flow direction so that the liquid flows from upstream to downstream, comprising:

a. a first electrode, a portion of which is disposed within the liquid, the first electrode comprising a first plate having a first top edge, and an opposite first bottom edge and first flat surface, disposed so that the first flat surface is in alignment with the flow direction;

b. a second electrode, a portion of which is disposed within the liquid, spaced apart from the first electrode, the second electrode comprising a second plate having a second flat surface, a second top edge and an opposite second bottom edge, the second electrode being disposed so that the second flat surface is in alignment with the flow direction and so that the second electrode is downstream from the first electrode, the second plate comprising a copper and silver alloy, wherein the ratio of copper to silver is in the range of from 1:1 to 11:3;

c. a buoyant member having a top surface and an opposite bottom surface, a portion of the buoyant member floating in the liquid, the first electrode and the second electrode being suspended from the buoyant member;

d. a plurality of spacers that separate the first electrode and the second electrode from the bottom surface of the buoyant member so that the first electrode and the second electrode extend below any oil or debris that floats on the surface of the liquid;

e. a direct current power supply, having a positive terminal and a negative terminal, for applying an electrical potential between the second electrode and the first electrode, thereby creating an electrical current from the second electrode to the first electrode and thereby liberating copper ions and silver ions from the second electrode into the liquid; and f. means for controlling the electrical current so that the copper ions have a concentration in the liquid of less than 5 parts per million and so that the silver ions have a concentration in the liquid of less than 40 parts per billion.

17. The apparatus of claim 16, wherein the direct current power supply further comprises means for periodically switching between a first voltage polarity, wherein the first electrode is positive and the second electrode is negative, and a second voltage polarity, wherein the first electrode is negative and the second electrode is positive.

18. The apparatus of claim 16 wherein the buoyant member defines a first hole and a second hole, each passing therethrough, the apparatus further comprising:

a. a first conductive rod having a first top end and a first bottom end, the first bottom end affixed to the first top edge of the first electrode, the first conductive rod projecting through the first hole so that the first top end extends above the top surface of the buoyant member, the negative terminal of the power supply being in electrical communication with the first top end; and b. a second conductive rod having a second top end and a second bottom end, the second bottom end affixed to the second top edge of the second electrode, the second conductive rod projecting through the second hole so that the second top end extends above the top surface of the buoyant member, the positive terminal of the power supply being in electrical communication with the second top end, so that the power supply applies the electrical potential between the first top end and the second top end.

19. An apparatus for reducing micro-organism concentrations in a liquid having a surface, comprising:

a. a first electrode, a portion of which is disposed within the liquid;

b. a second electrode, a portion of which is disposed within the liquid, spaced apart from the first electrode, the second electrode comprising a copper and silver alloy, wherein the ratio of copper to silver is in the range of from 1:1 to 11:3;

c. a direct current power supply for applying an electrical potential between the second electrode and the first electrode, creating an electrical current from the second electrode to the first electrode, thereby causing the second electrode to liberate copper ions and silver ions into the liquid;

d. means for controlling the electrical current so that the copper ions have a concentration in the liquid of less than 5 parts per million and so that the silver ions have a concentration in the liquid of less than 40 parts per billion; and e. a sheath defining a first cavity and a second cavity, the first electrode disposed within the first cavity and the second electrode disposed within the second cavity, the sheath comprising a material that allows the liquid to flow into and out of the cavity and that allows ions produced by the second electrode to flow out of the cavity.

20. The apparatus of claim 19 wherein the sheath comprises a material that defines a plurality of openings passing therethrough, the diameter of the openings being in the range of from 1/64th of an inch to 1/2 of an inch.

21. The apparatus of claim 19 wherein the liquid flows through a tank having an outer wall and further comprising means for suspending the sheath so that first electrode and the second electrode are disposed below the surface of the liquid spaced away from the outer wall.

22. The apparatus of claim 21 wherein the suspending means comprises a rod having a first end in an affixed relation to the wall of the tank and an opposite second end extending away from the wall so that the sheath hangs from the second end.

23. A method of reducing micro-organism concentrations in a flowing liquid, comprising the steps of:

a. placing a portion of a first electrode within the liquid;

b. placing a portion of a second electrode within the liquid, downstream and spaced apart from the first electrode, the second electrode comprising a copper and silver alloy wherein the ratio of copper to silver is in the range of from 1:1 to 11:3;

c. applying a direct current electrical potential between the second electrode and the first electrode, thereby creating an electrical current from the second electrode to the first electrode and thereby liberating copper ions and silver ions from the second electrode into the liquid; and d. controlling the electrical current so that the copper ions have a concentration in the liquid of less than 5 parts per million and so that the silver ions have a concentration in the liquid of less than 40 parts per billion.

* * * * *

UNITED STATES PATENT AND TRADEMARK OFFICE
CERTIFICATE OF CORRECTION

PATENT NO.   :  5,783,090
DATED        :  July 21, 1998
INVENTOR(S)  :  George S. Glenn It is certified that error appears in the above-identified patent and that said Letters Patent is hereby corrected as shown below:

Title page, Item [19]: change "Gleen" to --Glenn--.
Title Page, Item [76]: change "Gleen" to --Glenn--.

Column 8, line 61: change "of from 11 to 11:3" to --1:1 to 11 : 3--.

Signed and Sealed this

Nineteenth Day of January, 1999

*Acting Commissioner of Patents and Trademarks*

Attest:

Attesting Officer